(12) United States Patent
DeLano et al.

(10) Patent No.: US 6,931,489 B2
(45) Date of Patent: Aug. 16, 2005

(54) APPARATUS AND METHODS FOR SHARING CACHE AMONG PROCESSORS

(75) Inventors: Eric DeLano, Fort Collins, CO (US); Samuel David Naffziger, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 256 days.

(21) Appl. No.: 10/217,068

(22) Filed: Aug. 12, 2002

(65) Prior Publication Data

US 2004/0030845 A1 Feb. 12, 2004

(51) Int. Cl.⁷ ............................................. G06F 12/08
(52) U.S. Cl. ..................... 711/122; 711/202; 711/145
(58) Field of Search .............................. 711/145, 202, 711/144, 154, 150, 152, 146, 156, 118, 122, 128; 712/17

(56) References Cited

U.S. PATENT DOCUMENTS

| | | | | |
|---|---|---|---|---|
| 5,253,203 A | * | 10/1993 | Partovi et al. | ......... 365/189.02 |
| 5,586,279 A | * | 12/1996 | Pardo et al. | ................. 711/128 |
| 5,675,529 A | * | 10/1997 | Poole | .......................... 365/63 |
| 5,737,757 A | | 4/1998 | Hassoun et al. | |
| 6,408,361 B1 | * | 6/2002 | Petersen et al. | ............ 711/129 |
| 6,532,519 B2 | | 3/2003 | Arimilli et al. | |
| 6,594,728 B1 | * | 7/2003 | Yeager | ........................ 711/127 |
| 6,631,444 B2 | * | 10/2003 | Smits et al. | ................. 711/118 |
| 6,725,343 B2 | * | 4/2004 | Barroso et al. | ............. 711/145 |

OTHER PUBLICATIONS

"A 1Mb CMOS DRAM with a Divided Bitline Matrix Architecture", by Taylor & Johnson, Mostek Corporation, ISSCC 85, Feb. 15, 1985, pp. 242–243.*

Hennessy et al., Network Topologies, Chapter 9.6, Computer Organization and Design, The Hardware/Software Interface, Chapter 9, Multiprocessors, Morgan Kaufmann Publishers, Inc., 1998, pp. 736–739.*

Olukotun, Kunle, et al., "The Case For a Single–Chip Multiprocessor", Proceedings of the Seventh Int'l Conference on Architectural Support for Programming Languages and Operating Systems, Cambridge, MA, Oct. 1996.

Jim Handy, The Cache Memory Book, Academic Press, 1998, pp. 44–48.

* cited by examiner

*Primary Examiner*—Pierre-Michel Bataille

(57) ABSTRACT

A processing system including a plurality of processors, a cache data array, and a crossbar interface connecting the processors with the cache data array. Each processor includes a tag array mapped to the cache data array. In another embodiment, the cache data array includes a plurality of sub-arrays accessible via a plurality of ports of the crossbar interface. The system allows an upper-level cache data array to be shared among processors while cache latency is reduced.

19 Claims, 8 Drawing Sheets

APPARATUS AND METHODS FOR SHARING CACHE AMONG PROCESSORS

FIELD OF THE INVENTION

The present invention relates generally to multiprocessing systems and, more particularly, to sharing cache memory among processors in a multiprocessing system.

BACKGROUND OF THE INVENTION

Processors in multiprocessing systems typically utilize a hierarchy of caches to speed access to data stored in a main memory of the system. The first level of such a hierarchy usually is a small, fast primary (L1) cache that may be integral to the processor. Upper levels of cache memory commonly are shared among the processors. The processors typically arbitrate for access to a shared second-level (L2) cache memory in which a tag array and a data array are stored. A central arbiter, for example, a cache controller driven by arbitration logic, determines the order in which the processors gain access to the L2 cache. The cache controller utilizes the L2 tag array to access data held in the L2 data array and transmits the data to a requesting processor.

Because processor accesses to the L2 cache typically are serialized, system performance can be slowed during times when more than one processor makes intensive use of the L2 cache. One alternative would be to provide multiple ports to the L2 cache tag array so that more than one processor at a time could retrieve data, but such systems can be prohibitively expensive.

SUMMARY OF THE INVENTION

The present invention, in one embodiment, is directed to a processing system including a plurality of processors, a cache data array, and a crossbar interface connecting the processors with the cache data array. Each of the processors includes a tag array mapped to the cache data array.

The above described processing system embodiments allow a processor to access an L2 cache data array over a crossbar that also may be used to perform other processing system routing and arbitration functions. In embodiments in which cache data sub-arrays are used, one processor can access one L2 sub-array via one crossbar port at the same time that another processor accesses another sub-array via another crossbar port. Thus an upper-level cache data array can be shared among a plurality of processors while cache latency is reduced. The crossbar interface provides routing among processors and cache data arrays. Thus it is unnecessary to provide complex logic for arbitrating among processors for upper-level cache access.

Further areas of applicability of the present invention will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of embodiments of the present invention is merely exemplary in nature and is in no way intended to limit the invention, its application, or uses. Although embodiments of the present invention are described in connection with second-level cache, the invention is not so limited. Embodiments of the invention also can be practiced in connection with levels of cache higher than second level (L2) cache.

Figure 1:
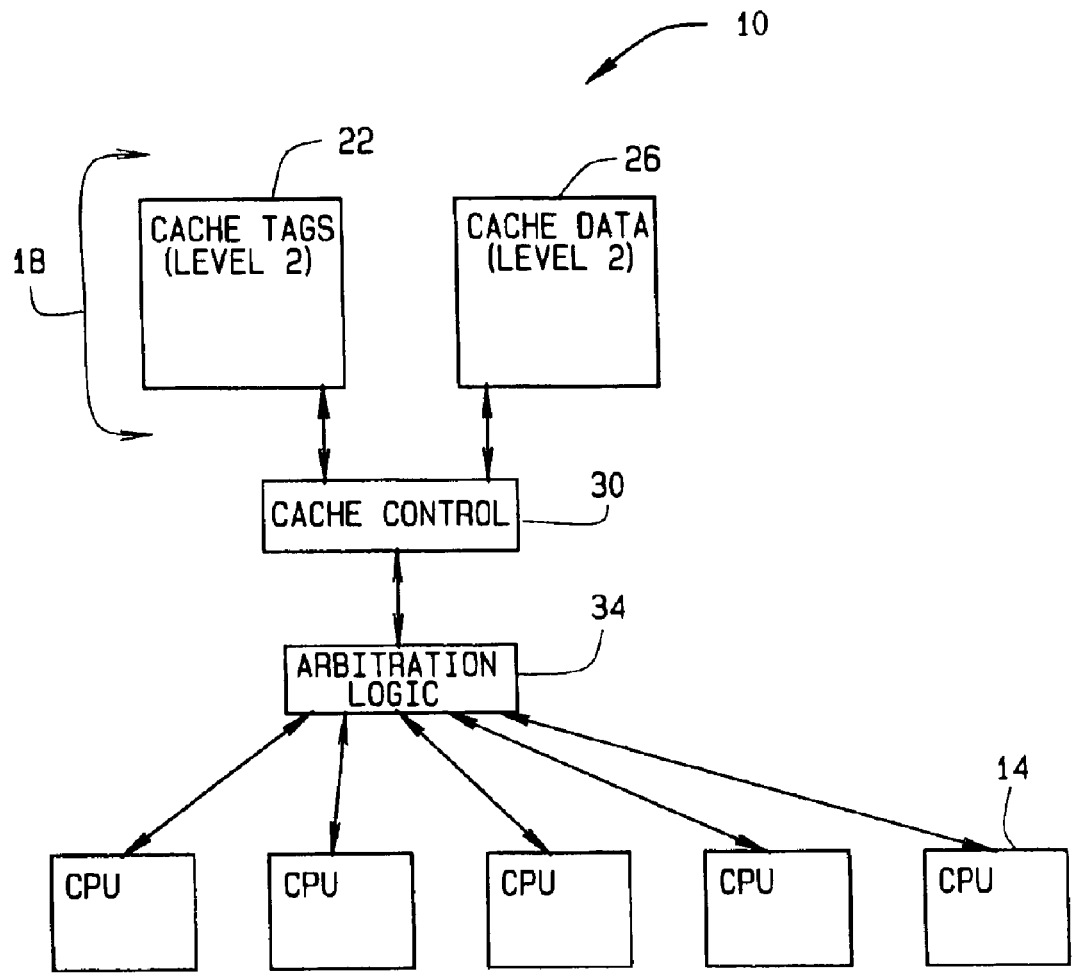
FIG. 1 is a diagram of a multiprocessing system of the prior art.

A simplified conventional multiprocessing system is generally indicated in FIG. 1 by reference number 10. The system 10 includes a plurality of processors 14 that share an L2 cache 18. The cache 18 includes a tag array 22 and a data array 26. The data array 26 holds lines of data from a main memory (not shown in FIG. 1) that have been requested for use by at least one of the processors 14. The tag array 22 is mapped to the data array 26, and the data array 26 contains data corresponding to addresses indicated by the tag array 22. Coherency of the data array 26 with respect to the main memory and other caches (not shown) is maintained by cache coherency techniques known in the art.

The processors share the cache 18 under control of a cache controller 30 driven by arbitration logic 34. The processors 14 are provided access to the cache 18 sequentially, in order of relative priority embodied in the arbitration logic 34. A data request from a processor 14 is processed in the L2 cache in the following manner. The cache tag array 22 is searched to determine whether the requested data is held in the data array 26. If the data is present in the array 26 (i.e. if there is a cache "hit"), the cache controller 30 sends the data to the requesting processor 14. If the data is not in the array 26 (a cache "miss"), the data is retrieved from the main memory, stored in the data array 26 and delivered to the requesting processor 14. Delivery of the data to the processor 14 also may be prioritized by the cache controller 30 according to the arbitration logic 34. Thus the processors 14 may be required to wait for delivery of data from the cache 18 (i.e. cache latency may increase) when there is contention among the processors 14 for use of the cache 18.

Figure 2:
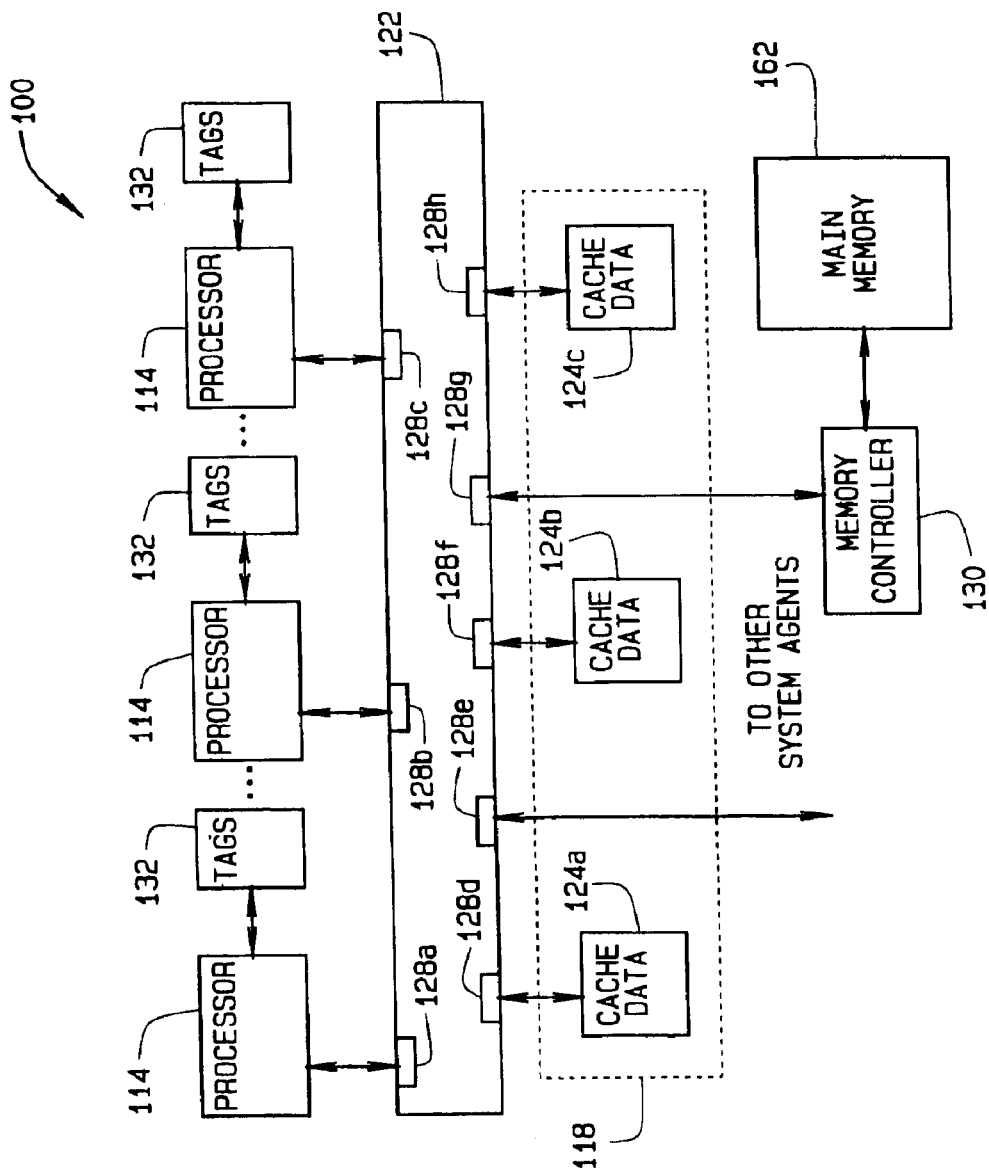
FIG. 2 is a diagram of a multiprocessing system according to one embodiment of the present invention.

A multiprocessing system according to one embodiment of the present invention is generally indicated in FIG. 2 by reference number 100. The system 100 includes a plurality of processors 114 linked with a cache data array 118 via a crossbar interface 122. In the embodiment shown in FIG. 2, the cache data array 118 includes a plurality of sub-arrays 124, each sub-array 124 connected to a corresponding port 128 of the crossbar interface 122. The sub-arrays 124 are connected to ports 128*d*, 128*f* and 128*h*, and the processors are connected to ports 128*a*, 128*b* and 128*c*. Other agents of the system 100, for example, a memory controller 130, a main memory 162 and input-output modules (not shown), can be connected to the crossbar 122 via ports 128*e* and 128*g*.

As shall be further described below, the data array 118 is configured to hold lines of data retrieved from the main memory 162 upon request(s) for the data by at least one of the processors 114. In the embodiment shown in FIG. 2, three cache data sub-arrays 124 are configured to hold lines of data retrieved from mutually exclusive portions (thirds) of the main memory 162. Other embodiments are possible wherein more, or fewer, than three sub-arrays are used. Embodiments also are contemplated in which the data array 118 is configured without sub-arrays, as further described below.

Each processor 114 has a tag array 132 that describes locations of lines of data in the data array 118. In the embodiment shown in FIG. 2, each processor 114 has a dedicated tag array 132. In other embodiments, two or more processors 114 may share a tag array 132. In embodiments in which each of the processors 114 is configured to utilize the entire data array 118, each of the tag arrays 132 is mapped to the entire data array 118. Embodiments also are contemplated in which a processor 114 utilizes only a portion of the data array 118. The tag array 132 for such processor is mapped to less than the entire data array 118.

Figure 3:
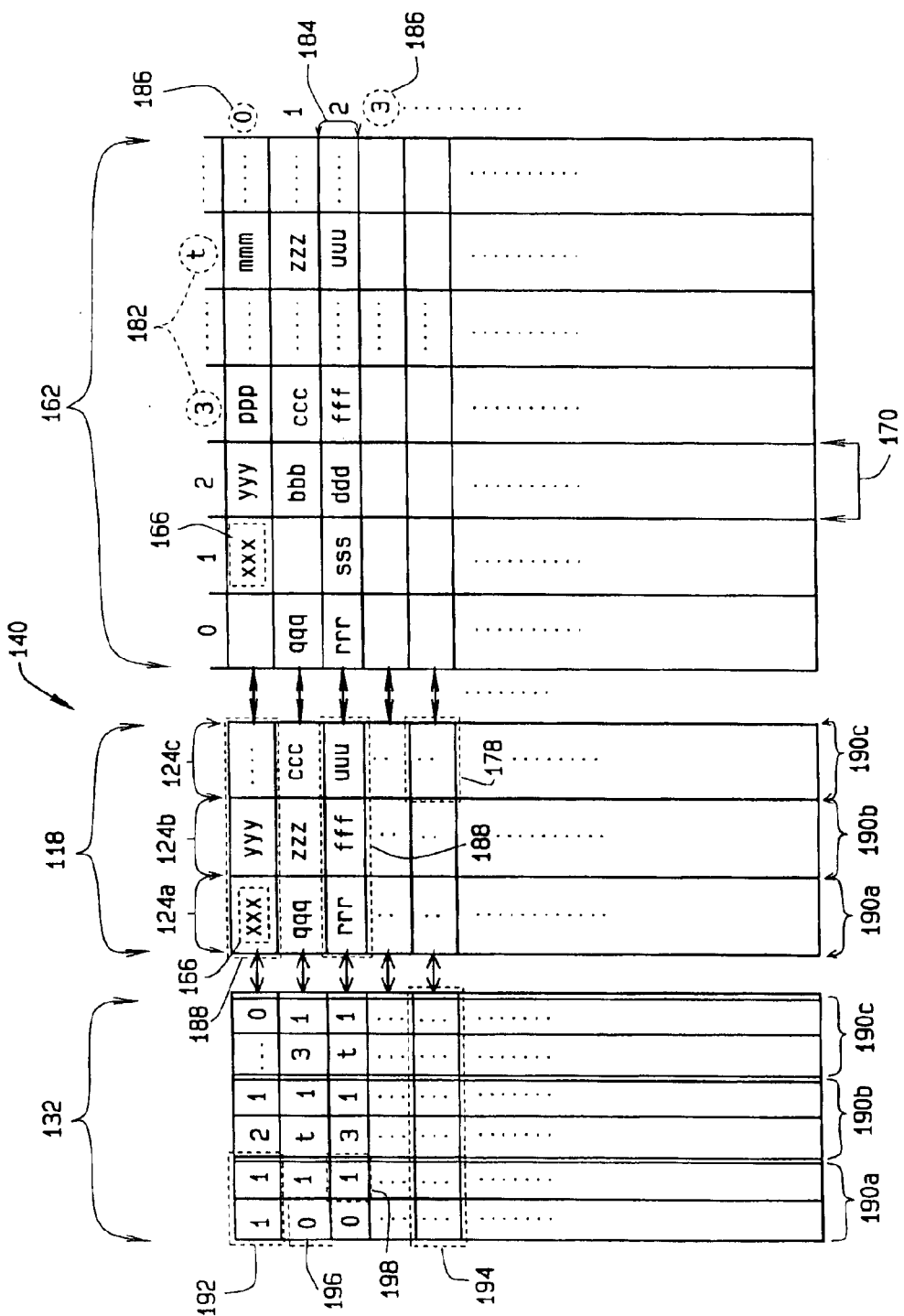
FIG. 3 is a diagram of a method for mapping a tag array and a cache data array relative to a main memory according to one embodiment.

Various mapping methods can be used in configuring the tag arrays 132 and the data array 118. For example, a three-way set-associative mapping method, indicated generally in FIG. 3 by reference number 140, can be used to configure the tag arrays 132 and data array 118 relative to the main memory 162. As shown in FIG. 3, one of the tag arrays 132 is mapped to the data array 118, which contains data corresponding to main memory 162 addresses indicated by the tag array 132. Lines 166 of data stored in the main memory 162 are aligned on cache line boundaries 170, such that the lines of data 166 are equal in length to data storage lines 178 in the cache data array 118.

As shall be described in greater detail below, a predetermined number of high-order bits of each address for data in main memory 162 can be used as a tag reference 182. Additionally, the main memory 162 can be considered to be divided into a plurality of groups 184. A predetermined number of lower-order bits of each address for data in main memory 162 can be used as a group identifier 186. Although not shown in FIG. 3, the lowest-order bits of each main memory 162 address can be used to refer to individual bytes of a stored line of data.

Each group 184 is associated with a set 188 of three data storage lines 178 in the data array 118. Each of the three data storage lines 178 of a set 188 can be considered to represent one of three "ways" 190 in which a line of data 166 can be stored in the data array 118. The sub-arrays 124 of the data array 118 are configured in relation to the ways 190 in which the data can be stored. For example, as shown in FIG. 3, the sub-array 124*a* includes data storage lines 178 wherein lines 166 are stored in a first way 190*a*. The sub-array 124*b* includes data storage lines 178 wherein lines 166 are stored in a second way 190*b*, and sub-array 124*c* includes data storage lines 178 wherein lines 166 are stored in a third way 190*c*. It should be noted, however, that although the ways 190 shown in FIG. 3 are in one-to-one correspondence with the sub-arrays 124, in other embodiments there may be more than one way associated with a sub-array. For example, a six-way set-associative cache could be configured such that each of three cache data array sub-arrays holds lines stored in two ways.

For every data storage line 178 in the cache data array 118, the tag array 132 includes a corresponding element 192. The tag array elements 192 are arranged in sets 194 corresponding to the cache data array sets 188 (and to the groups 184 in main memory 162). Thus the tag array 132 reflects the ways 190 in which the data lines 166 are stored in the data array 118. As used herein, the term "element" is defined as a location (which may or may not be occupied by valid data) within an array. Each element 192 of the tag array 132 includes a tag entry 196 and a "valid" bit 198. Although not shown in FIG. 3, tag array elements 192 may also hold additional information pertinent to cache coherency. Such information can include status bits such as "dirty" bits and "exclusive/shared" bits as known in the art.

When a line of data 166 is written to the cache data array 118, it is written into one of the three data storage lines 178 in the set 188 associated with the group 184 of the main memory 162 from which the line of data 166 is being written. Which of the three data storage lines 178 is selected to receive a data line 166 is based in part on the contents of the "valid" bit 198 of the tag element 192 corresponding to a storage line 178, as further described below. When a line of data 166 is written into a data storage line 178, the tag reference 182 referencing the line of data 166 in main memory 162 is written into the corresponding tag entry 196 of the tag array 132. The corresponding "valid" bit 198 also is updated to indicate that the data storage line 178 into which the line of data 166 is written contains valid data.

As previously described, each line address in the main memory 162 includes a tag reference 182 and a group reference 186. When a processor 114 requests data from an address in the main memory 162, the elements 192 of the tag array set 194 corresponding to the group reference 186 for the requested address are searched for the tag reference 182 for the requested address. If a cache miss occurs, the requested data line is retrieved from the main memory 162 and stored in the data array 118. Data lines are stored in the data array 118 under control of at least one replacement algorithm, as shall be further described below.

If a cache hit occurs, the requested line of data 166 is retrieved from the cache data array 118 as follows. The tag array element 192 pointing to the requested line 166 has the same relative location within its tag set 194 as the relative position of the requested line 166 within its data array set 188. That is, the way 190 of storing the requested line of data 166 is reflected in both the tag and data arrays. The way 190 also identifies the sub-array 124 in which the data line 166 is held, and thus also identifies a crossbar port 128 (shown in FIG. 2) via which the appropriate sub-array 124 is accessible. More specifically, the processor 114 uses a preset correspondence between sub-arrays 124 and ports 128, or alternatively, a route table (not shown) stored in the processor, to identify the appropriate port 128. The processor 114 sends a data request to the sub-array 124 via the crossbar 122. The requested line of data 166 is sent from the appropriate sub-array 124, across the crossbar 122, to the requesting processor 114.

Figure 4:
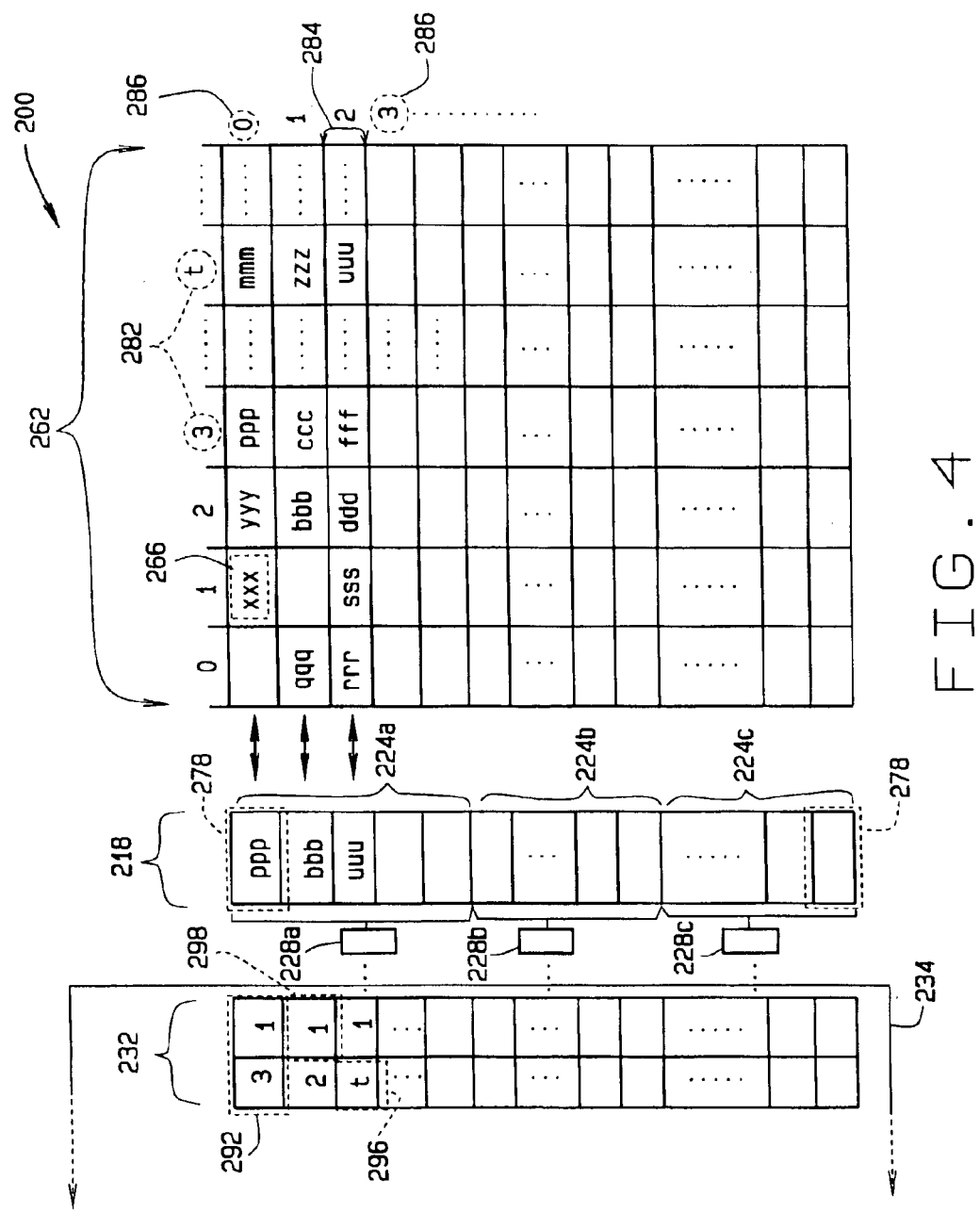
FIG. 4 is a diagram of a method for mapping a tag array and a cache data array relative to a main memory according to one embodiment.

An embodiment of a method for configuring a tag array and three data sub-arrays using direct mapping is generally indicated by reference number 200 in FIG. 4. As shown in FIG. 4, a tag array 232 of a processor 234 is mapped to a data array 218, which contains data corresponding to main memory 262 addresses indicated by the tag array 232. The data array 218 includes three sub-arrays 224a, 224b and 224c, each sub-array 224 connected with the processor 234 via ports 228a, 228b and 228c of a crossbar (not shown).

Each main memory group 284 is associated with a data storage line 278 in the data array 218. For every data storage line 278 in the data array 218, the tag array 232 includes a corresponding element 292. Each of the tag array elements 292 thus is associated with one of the three sub-arrays 224. Each element 292 of the tag array 232 includes a tag entry 296 and a "valid" bit 298. Although not shown in FIG. 4, tag array elements 292 may also hold additional information pertinent to cache coherency.

When a line of data 266 is written to the cache data array 218, it is written into the data storage line 278 associated with the group 284 of the main memory 262 from which the line of data 266 is being written. When a line of data 266 is written into a data storage line 278, the tag 282 referencing the line of data 266 in main memory 262 is written into the corresponding tag entry 296 of the tag array 232. The corresponding "valid" bit 298 also is updated.

When the processor 234 requests data from an address in the main memory 262, the tag entry 296 of the tag element 292 corresponding to the group reference 286 for the requested address is checked for the tag reference 282 for the requested address. If a cache miss occurs, the requested data is retrieved from the main memory 262 and stored in the data array 218 as described above. If a cache hit occurs, the line of data 266 is retrieved from the cache data array 218 as follows. The location of the tag array element 292 for the requested line of data 266 identifies the particular sub-array 224 in which the requested data line 266 is held, and thus also identifies a crossbar port 228 via which the requested data line can be retrieved. The requested line of data 266 is sent from the appropriate sub-array 224 via the crossbar port 228 to the processor 234.

Although the foregoing embodiments have been described in connection with three-way set-associative and direct mapping, other embodiments are contemplated in which set-associative mappings having more than three "ways" are used. In such an embodiment, and referring to FIG. 3, more than one "way" 190 may be associated with a particular sub-array 124. Additionally, mappings in other embodiments may include associative mappings having two or fewer "ways". Embodiments also are possible wherein a plurality of cache data sub-arrays differ from one another in size. For example, where data is distributed in the main memory such that one sub-array holds data tending to be used intensively by processors while another sub-array holds relatively less frequently used data, the more frequently used sub-array can be configured larger than the less frequently used sub-array. Thus a number of cache misses could be reduced in such circumstances.

Figure 5:
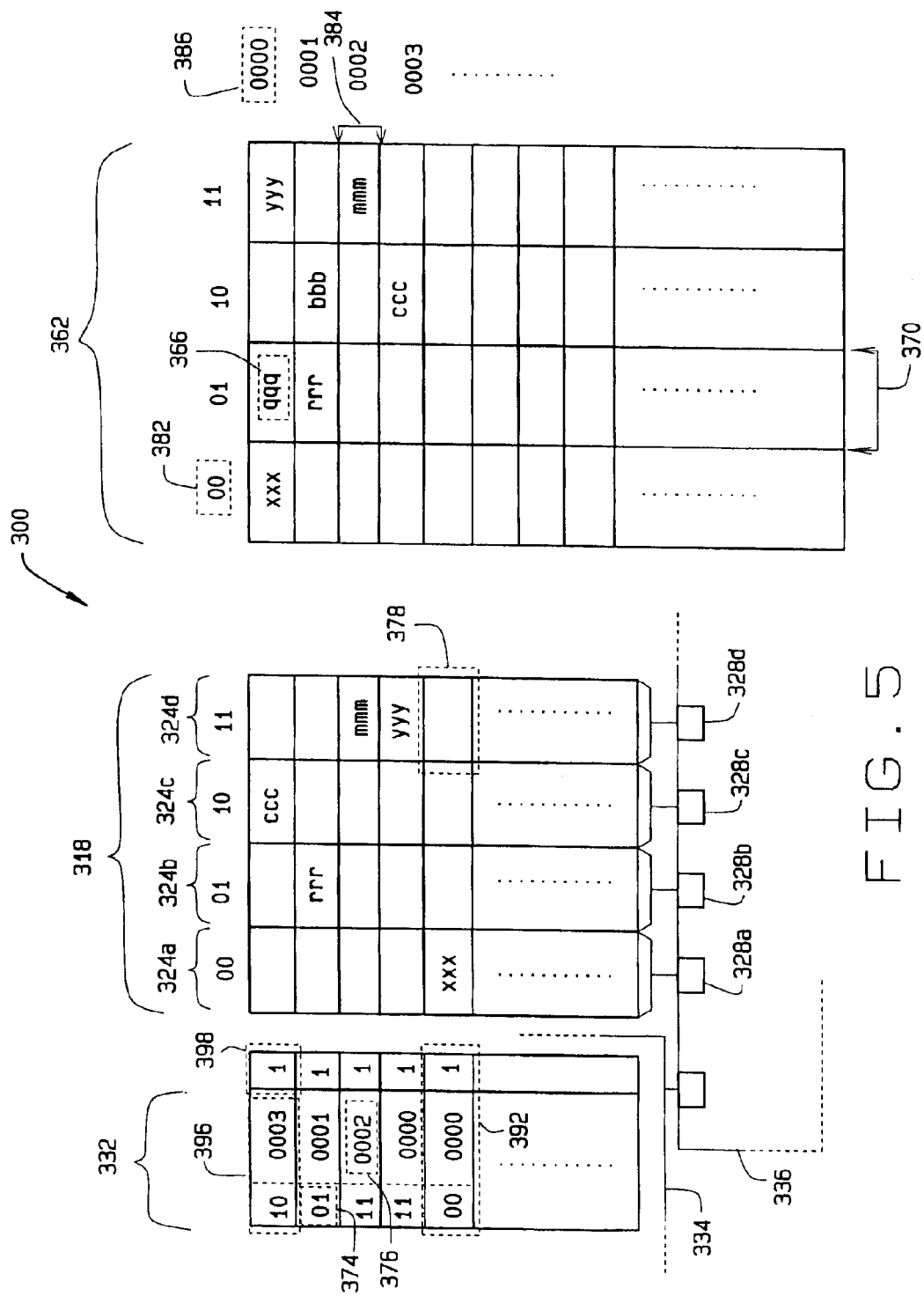
FIG. 5 is a diagram of a method for mapping a tag array and a cache data array relative to a main memory according to one embodiment.

In another exemplary embodiment of a mapping indicated generally as 300 in FIG. 5, a tag array 332 of a processor 334 is mapped to a data array 318. The data array 318 has four sub-arrays 324a, 324b, 324c and 324d connected respectively with the processor 334 via ports 328a–d of a crossbar 336. The data array 318 contains lines stored in a main memory 362 as indicated by the tag array 332. Lines 366 of data stored in the main memory 362 are aligned on cache line boundaries 370, such that the lines of data 366 are equal in length to data storage lines 378 in the cache data array 318. A predetermined number of high-order bits (e.g. two bits as shown in FIG. 5) of each main memory 362 address is used as a tag reference 382. Additionally, the main memory 362 is divided into a plurality of groups 384. A predetermined number of lower-order bits (e.g. four bits as shown in FIG. 5) of each main memory 362 address is used as a group identifier 386.

For every data storage line 378 in the cache data array 318, the tag array 332 includes a corresponding element 392. Each element 392 of the tag array 332 includes a tag entry 396 and a "valid" bit 398. Although not shown in FIG. 5, tag array elements 392 may also hold additional information pertinent to cache coherency, e.g. "dirty" bits and "exclusive/shared" bits.

When a line of data 366 is written into a data array storage line 378 as further described below, the tag reference 382 referencing the line of data 366 in main memory 362 is written into high-order bits 374 of an available tag entry 396. Additionally, the group reference 386 for the line 366 is written into low-order bits 376 of the tag entry. Thus the tag entry 396 holds the entire main memory address for a line 366 held in the data array 318. The corresponding "valid" bit 398 also is updated to indicate that the data storage line 378 into which the line of data 366 is written contains valid data.

In the present embodiment, each of the data array sub-arrays 324 is associated with a main memory tag reference 382. When a line 366 is written from main memory 362 to the array 318, it is written to the sub-array 324 corresponding to the tag reference 382 for the line. An available tag element 392 also is updated, as described above. Thus each sub-array 324 embodies a "way" of storing a line 366 in the array 318, and the "ways" are reflected in the high-order bits 374 of the tag entries 396 for each stored line. As can be seen in FIG. 5, tag elements 392 can be stored in the tag array 332 in any order, and lines 366 can be stored in the corresponding sub-array 324 in any order.

When the processor 334 requests data from an address in the main memory 362, the tag entries 396 of the tag array are searched for the requested address. If a cache miss occurs, the requested data line is retrieved from the main memory 362 and stored in the data array 318. Data lines are stored in the data array 318 under control of at least one replacement algorithm, as shall be further described below.

If a cache hit occurs, the requested line of data 366 is retrieved from the cache data array 318 as follows. The tag reference 382 for the requested line (reflected in the high-order bits 374 of the corresponding tag entry 392) is decoded to determine which sub-array 324 holds the line 366. Identifying the sub-array 324 in which the data line 366 is held also identifies a crossbar port 328 via which the appropriate sub-array 324 is accessible by the processor 334. More specifically, the processor 334 uses a preset correspondence between sub-arrays 324 and ports 328, or alternatively, a route table (not shown) stored in the processor, to identify the appropriate port 328. When the processor request for the line reaches the appropriate sub-array 324, the sub-array is searched by group reference 386 (reflected in the low-order bits 376 of the corresponding tag entry 392) to find the requested line 366. The requested line of data 366 is sent from the appropriate sub-array 324 to the processor 334.

Figure 6:
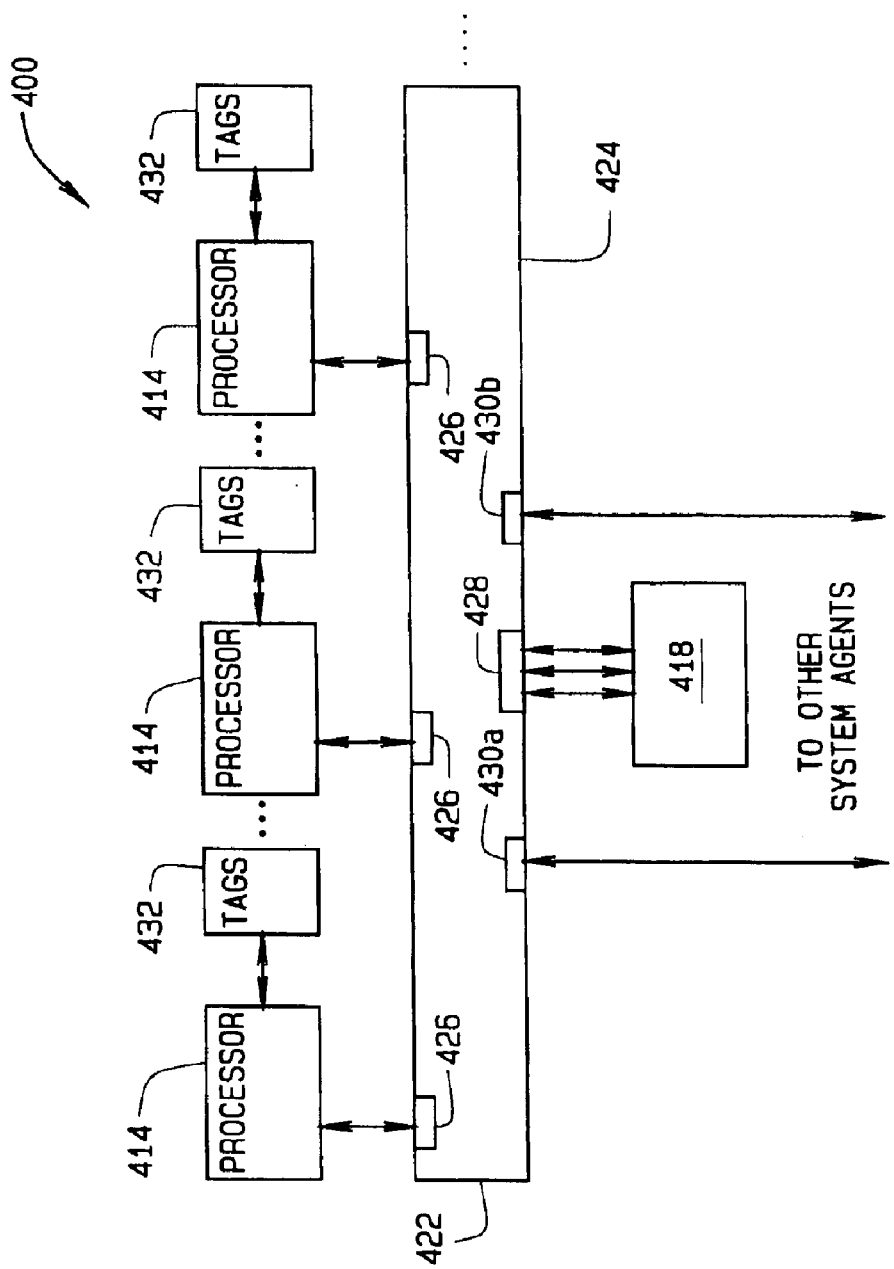
FIG. 6 is a diagram of a multiprocessing system according to one embodiment.

Another exemplary embodiment is shown in FIG. 6, wherein a multiprocessing system is generally indicated by reference number 400. The system 400 includes a plurality of processors 414 linked with a cache data array 418 via a crossbar interface 422. The crossbar interface includes at least one crossbar 424. Each processor 414 is connected to the crossbar 424 at a port 426 and has a dedicated tag array 432 mapped to the data array 418. The crossbar 424 is configured to provide, at a port 428, a connection having wider bandwidth relative to other ports of the crossbar 424. Such a crossbar is described in co-pending U.S. patent application Ser. No. 10/147,193 by Naffziger et al., entitled "Configurable Crossbar and Related Methods", filed May 16, 2002, the disclosure of which is incorporated herein by reference in its entirety. The crossbar 424 can reduce or eliminate "bottlenecking" at the port 428 while a plurality of processors 414 access the data array 418. Other agents (not shown in FIG. 6) of the system 400, for example, memory controllers and input-output modules, can be connected to the crossbar interface 422 via ports 430a and 430b.

The crossbar 424 is configured in accordance with principles that now shall be described with reference to an exemplary crossbar indicated as 434 in FIG. 7. The crossbar 434 includes four ports 444, 448, 452 and 456. Each of the ports 444, 448, 452 and 456 includes a plurality of data mini-ports 460 having equal bit widths. Each mini-port 460 has a bit width of four bits. The port 444 includes mini-ports 460a–460d, the port 448 includes mini-ports 460e–460h, the port 452 includes mini-ports 460i–460l, and the port 456 includes mini-ports 460m–460p.

Each of the ports 444, 448, 452 and 456 also has a control bit width of four bits, i.e. a four-bit control connection or control sub-port 464 which shall be further described below. Specifically, the port 444 includes control sub-port 464a, the port 448 includes control sub-port 464b, the port 452 includes control sub-port 464c and the port 456 includes control sub-port 464d. The term "control sub-port" includes explicit control sub-ports and implicit control sub-ports. An implicit control sub-port includes data bits extracted as defined by a protocol to carry control information. In an explicit control sub-port, data bit width is not defined as control bit width. A multiplexer switch 468 internal to the crossbar 434 selectively connects data signals between mini-ports 460 on a crossbar side 472 and mini-ports 460 on a crossbar side 476.

Each of the control sub-ports 464 is configured to selectively control a domain of mini-ports 460 as further described below. Specifically, as shown in FIG. 7, the control sub-ports 464a and 464b are each separately configurable to control a mini-port domain 480 that may include the mini-ports 460a–460h. The control sub-ports 464c and 464d are each separately configurable to control a domain 484 that may include the mini-ports 460i–460p.

Each mini-port 460 includes a select line or select sub-port 490 by which a control sub-port 464 that includes a given mini-port 460 in its domain can be selected for controlling data signals via the given mini-port 460. Each select sub-port 490 can be set, for example, by hard wiring or by system programming option. Thus the mini-ports 460 can be configured with the control sub-ports 464 to provide a relatively wide data bit width for a relatively high-use path, and a relatively narrow data bit width for a relatively low-use path, through the crossbar 434.

Figure 7:
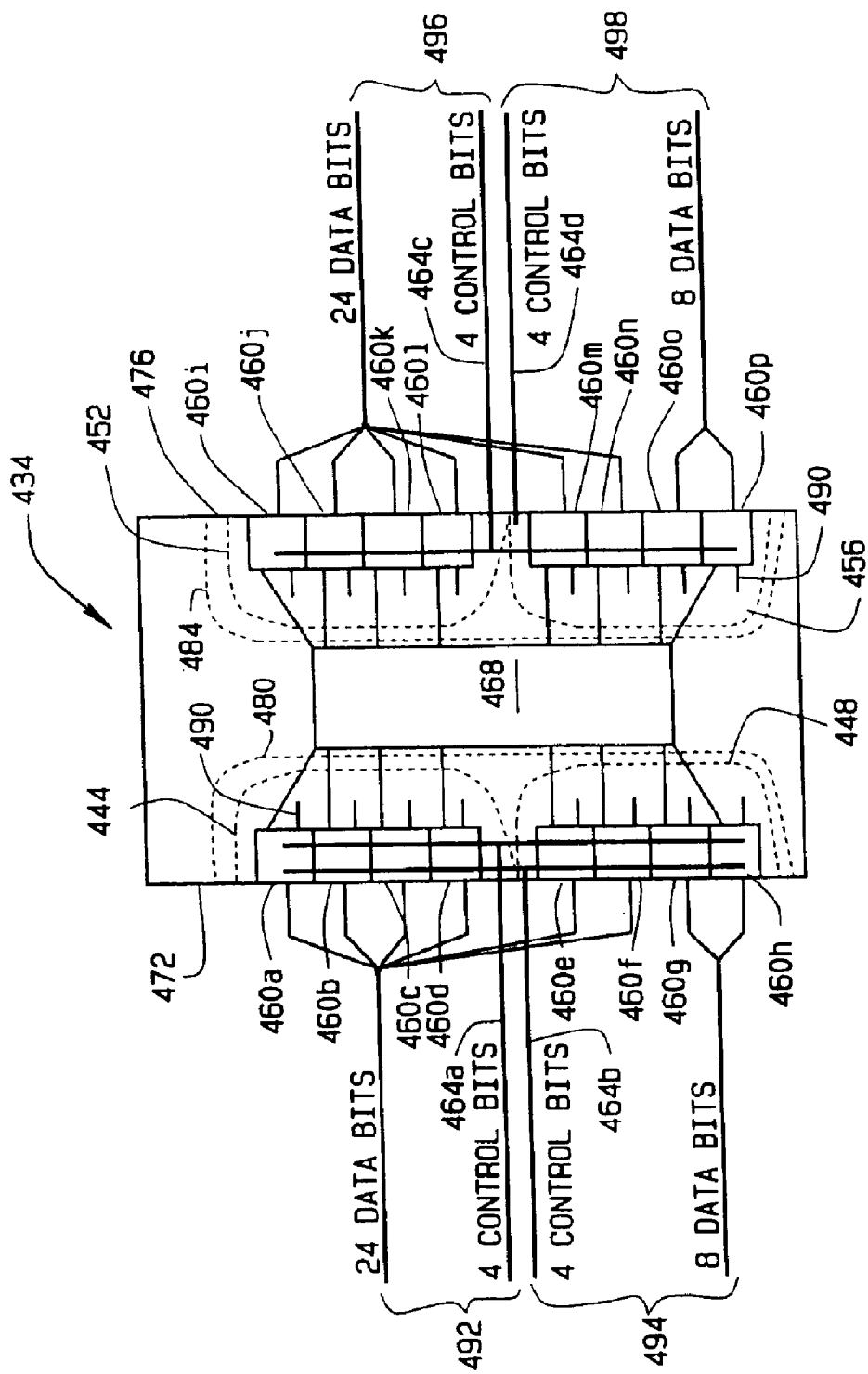
FIG. 7 is a schematic diagram of a crossbar configurable for transferring bit width between crossbar usage paths according to one embodiment.

For example, as shown in FIG. 7, the mini-ports 460 are configured with the control sub-ports 464 as connection points 492, 494, 496 and 498 (corresponding to ports such as ports 426, 428 and 430 shown in FIG. 6), by which up to four system agents (not shown) can be connected to the crossbar 434. The connection points 492 and 496 are configured for transferring twenty-four-bit wide data signals, and the connection points 494 and 498 are configured for eight-bit wide data signals. For example, on the crossbar side 472, the connection point 492 has a data bit width of twenty-four bits when the select lines 490 of the mini-ports 460a, 460b, 460c, 460d, 460e and 460f are signaled to select for control by the control sub-port 464a. On the other crossbar side 476, the connection point 496 also has a bit width of twenty-four bits when the select lines 490 of the mini-ports 460i, 460j, 460k, 460l, 460m and 460n are signaled to select for control by the control sub-port 464c. Thus the corresponding connection points 492 and 496 can provide a twenty-four-bit data connection over the crossbar 434. The connection point 494 on the crossbar side 472 has a bit width of eight bits when the select lines 490 of the mini-ports 460g and 460h are signaled to select for control by the control sub-port 464b. The corresponding connection point 498 has a bit width of eight bits when the select lines 490 of the mini-ports 460o and 460p are signaled to select for control by the control sub-port 464d. Thus the connection points 494 and 498 can provide an eight-bit data connection through the crossbar 434.

It is to be noted that no changes need be made to the switch 468 when configuring the connection points 492, 494, 496 and 498. Additionally, it should be understood that alternative pluralities and configurations of ports, mini-ports, mini-port domains, select sub-ports and/or control sub-ports are possible. For example, for a crossbar having P ports and Q mini-ports per port, a domain size could range between one mini-port and P*Q/2 mini-ports inclusively. For the example shown in FIG. 7, the number of ports P is 4, the number of mini-ports per port Q is 4, and domain size P*Q/2 is 8 mini-ports. Port and connection point bit widths, control port bit widths and/or mini-port bit widths alternative to those shown in FIG. 7 also could be utilized.

Figure 8:
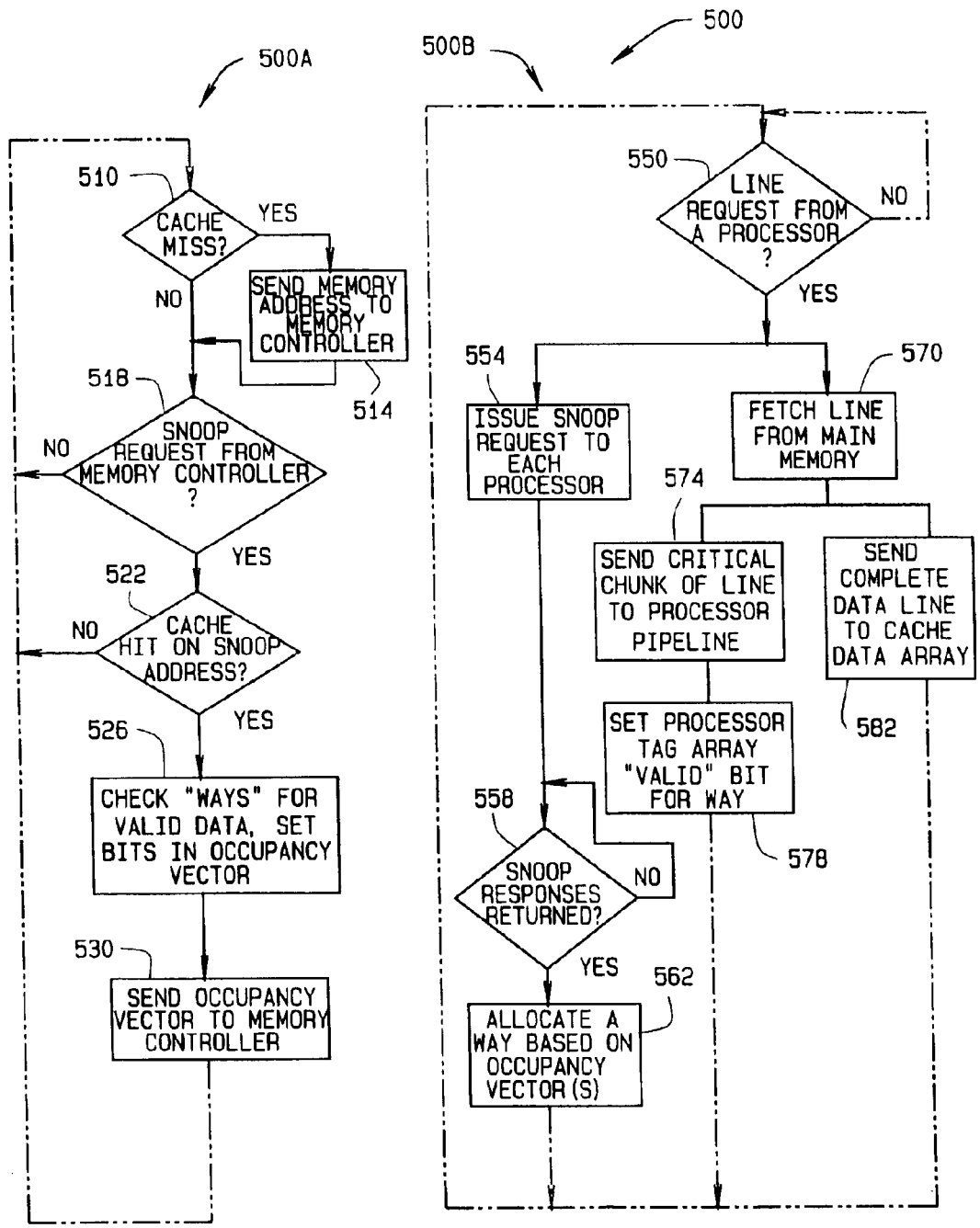
FIG. 8 is a flow diagram of a method for maintaining coherency among processor tag arrays in a multiprocessing system according to one embodiment.

In a processing system such as the system 100 (shown in FIG. 2), various conventional methods, e.g. MESI (Invalid, Exclusive, Shared, Modified) protocol, can be used to maintain coherency among a plurality of caches. Additionally, where a plurality of tag arrays can reference the same cache data array, an algorithm or method, an embodiment of which is referred to generally as 500 in FIG. 8, is useful for maintaining coherency with respect to placement and/or replacement of lines in the data array. The algorithm 500 shall be described with reference to the processing system 100 (shown in FIG. 2) and the mapping method 140 (shown in FIG. 3). In FIG. 8, actions specific to a processor 114 are generally referred to as 500A. Actions specific to a system agent for controlling coherency, for example, the memory controller 130, are generally referred to as 500B.

Actions 500A specific to a given processor 114 include the following steps. When the processor 114 requests a line from the data array 118, and a cache miss occurs at step 510, the requesting processor 114 at step 514 sends the main memory address for the requested line to the memory controller 130. The memory controller 130 responds to the request, as shall be described below with respect to actions 500B.

When a snoop request from the memory controller 130 is detected at step 518, the main memory address included in the snoop request is used at step 522 to search for a cache hit. For example, referring to the mapping described in FIG. 3, the set 194 in the processor tag array 132 indicated by the group reference 186 of the requested address is searched for a hit. If a hit occurs, at step 526 a subset of the requested main memory address 162, e.g. the tag and group references 182 and 186 (together sometimes called the cache index), are used to verify which of the ways in the addressed set are valid, e.g. which ways 190 in the data array 118 have a "valid" bit 198 in the tag array 132 indicating the presence of valid data. A validity or occupancy vector (not shown) is sent at step 530 to the memory controller 130. Each bit in the occupancy vector signifies the validity or invalidity of a corresponding way 190 in the addressed set 188. For example, for the three-way cache shown in FIG. 3, a three-bit occupancy vector would be sent to the memory controller 130.

Actions 500B specific to the memory controller 130 shall now be described. If the memory controller 130 at step 550 receives a line request from a processor 114, the memory controller 130 issues, to each processor 114 at step 554, a snoop request that includes the main memory 162 address for the requested line. Processor 114 snoop responses, returned at step 558 to the memory controller 130, include whether a hit has occurred and also include such status bits as "dirty" and "exclusive/shared" bits known in the art for maintaining cache coherency. Each processor 114 response also includes an occupancy vector as described above with reference to step 530.

At step 562, the memory controller 130 allocates a "way" for storing the requested line of data in the data array 118. The allocation is made based at least in part on the occupancy vectors returned by each processor 114. Specifically and for example, if there is no unoccupied "way" in the addressed data array set 188, the memory controller "victimizes" a processor 114 by issuing a command to the victimized processor 114 to flush, from its tag array 132, a reference to the way 190 being allocated by the memory controller.

In parallel with the snoop requests issued at step 554, the memory controller 130 fetches the requested line of data from the main memory 162 at step 570. At step 574 the memory controller 130 sends a "critical chunk" of the line of data to the pipeline of the requesting processor 114, as known in the art. At step 578, the memory controller 130 signals to the requesting processor 114 which "valid" bit 198 to set as valid for the way 190 being allocated. It is to be noted that the memory controller 130 can signal information to the processor at steps 574 and 578 either by separate messages or together in time.

In parallel with sending a critical chunk at step 574 to the requesting processor, the memory controller 130 sends the complete line of requested data to the cache data array 118 at step 582. When the controller 130 sends such data to a cache sub-array 124, it utilizes a way 190, as described above, to route the data line via the crossbar 122. The controller 130 also sends a sufficient number of bits of the line address to enable a cache controller (not shown) to write the data line to a data sub-array 124, and the cache controller writes the data line to the cache sub-array 124.

It should be noted that although the algorithm 500 is described with reference to a "snoop"-based model for maintaining cache coherency, the invention is not so limited. Other embodiments are contemplated, for example, for use in processing systems that utilize a directory-based model for maintaining cache coherency as known in the art.

The above described processing system embodiments allow an upper-level cache data array to be shared among a plurality of processors while cache latency is reduced. The crossbar interface provides routing among processors and cache data arrays. The crossbar also allows simultaneous transfers of data, for example, when two processors each access a different data sub-array. Furthermore, in embodiments in which a wide-bandwidth crossbar is used, data transfer among a plurality of processors and a cache data array can be accelerated. Thus it is no longer necessary to provide complex logic for arbitrating among processors for upper-level cache access.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A processing system comprising:
   a plurality of processors;
   a cache data array;
   a crossbar interface connecting the processors with the cache data array;
   wherein the cache data array includes a plurality of sub-arrays accessible via a plurality of ports of the crossbar interface; and
   a plurality of tag arrays, corresponding to the plurality of processors, respectively, each tag array being arranged so that a location of an entry in an element of the tag array indicates the location of the way where corresponding data is stored in the cache data array and being arranged so that a location of an entry in the element of the tag array further indicates one of the plurality of ports on the crossbar interface via which one of the sub-arrays containing the corresponding data is accessible.

2. The processing system of claim 1 further configured to provide parallel access to the cache data array by the plurality of the processors.

3. The processing system of claim 2 wherein the crossbar interface comprises at least one crossbar.

4. The processing system of claim 1 wherein the cache data array comprises a plurality of sub-arrays, each processor tag array mapped to at least one of the sub-arrays.

5. The processing system of claim 4 wherein the sub-arrays comprise different sizes.

6. The processing system of claim 4 wherein a number of the sub-arrays differs from a number of the tag arrays.

7. The processing system of claim 1 wherein the crossbar interface connects the processors with other agents of the processing system.

8. The processing system of claim 7 wherein the crossbar interface connects the cache data array with other agents of the processing system.

9. A processing system comprising:
   a plurality of processors;
   a plurality of cache data sub-arrays for holding data requested by at least one of the processors from a memory, each cache data sub-array comprising a crossbar port for interfacing with the processors;
   a crossbar having a plurality of ports, via which the processors are linked with the cache data sub-arrays; and
   a tag array corresponding to the plurality of processors, respectively, each tag array being arranged so that a location of an element of the tag array indicates the location of the way where corresponding data is stored in one of the plurality of cache data arrays and further being arranged so that a location of an entry in the element of the tag array further indicates by which one of the plurality of ports the indicated one of plurality of cache data sub-arrays is accessible.

10. The processing system of claim 9 wherein each processor is configured to access one of the cache data sub-arrays at the same time that another processor accesses another of the cache data sub-arrays.

11. A method for retrieving a data line from a cache data array holding at least one line of data requested by at least one of a plurality of processors from a memory, said method comprising the steps of:

searching a tag array for a tag reference for the data line, said step performed by a requesting processor;

locating the data line among a plurality of sub-arrays in the cache data array based upon the location in the tag array of the tag reference;

identifying one of a plurality or ports via which the sub-array holding the data line is accessible by the requesting processor; and delivering the located data line to the requesting processor.

12. The method of claim 11 wherein the locating and delivering steps are performed via a crossbar interface.

13. The method of claim 11 wherein the searching step is performed by the requesting processor using a tag array dedicated to the requesting processor.

14. The method of claim 13 further comprising the step of updating the tag array of the requesting processor to refer to the retrieved data line.

15. The method of claim 11 wherein the locating step is performed in one of a plurality of sub-arrays of the cache data array, via one of a plurality of crossbar ports corresponding to the sub-arrays.

16. The method of claim 15 wherein the tag array includes an element for each line of data in the cache data array, said method further comprising the step of associating a tag array element with a sub-array.

17. The method of claim 15 wherein the locating step is performed using an indication of a way where a data line is stored.

18. The method of claim 11 wherein the delivering step comprises the steps of:

victimizing a processor to allocate a way where the data line is to be stored in the cache data array;

retrieving the data line from the memory; and storing the retrieved data line in the cache data array.

19. The method of claim 11 wherein the delivering step comprises the step of using an occupancy vector for a processor tag array to allocate a way where the data line is to be stored in the cache data array.

* * * * *